(12) United States Patent
Shahin et al.

(10) Patent No.: US 10,889,751 B2
(45) Date of Patent: Jan. 12, 2021

(54) RESERVOIR STIMULATION BY ENERGETIC CHEMISTRY

(71) Applicant: Liberty Oilfield Services, LLC, Denver, CO (US)

(72) Inventors: Ahmed M. Shahin, Calgary (CA); Bilu Cherian, Calgary (CA)

(73) Assignee: Liberty Oilfield Services, LLC, Denver, CO (US)

(*) Notice: Subject to any disclaimer, the term of this patent is extended or adjusted under 35 U.S.C. 154(b) by 185 days.

(21) Appl. No.: 15/250,271

(22) Filed: Aug. 29, 2016

(65) Prior Publication Data

US 2017/0081584 A1    Mar. 23, 2017

Related U.S. Application Data

(60) Provisional application No. 62/211,479, filed on Aug. 28, 2015.

(51) Int. Cl.
*C09K 8/592*    (2006.01)
*C09K 8/588*    (2006.01)

(52) U.S. Cl.
CPC ............. *C09K 8/592* (2013.01); *C09K 8/588* (2013.01); *C09K 2208/32* (2013.01)

(58) Field of Classification Search
None
See application file for complete search history.

(56) References Cited

U.S. PATENT DOCUMENTS

| | | |
|---|---|---|
| 2,987,389 A | 6/1961 | Proell et al. |
| 3,044,912 A | 7/1962 | Proell et al. |
| 3,222,232 A | 12/1965 | Schwoyer |
| 3,270,815 A | 9/1966 | Osborn et al. |
| 3,377,909 A | 4/1968 | Grant et al. |
| 3,454,437 A | 7/1969 | Yamazaki et al. |
| 3,456,589 A | 7/1969 | Slykhouse et al. |
| 3,462,324 A | 8/1969 | Grant et al. |
| 3,610,340 A * | 10/1971 | Hutchison ............... C09K 8/52 166/311 |
| 3,713,487 A | 1/1973 | Lozanski |
| 3,759,574 A | 9/1973 | Beard |
| 4,178,993 A | 12/1979 | Richardson et al. |
| 4,219,083 A * | 8/1980 | Richardson ............. C09K 8/60 166/300 |
| 4,330,037 A | 5/1982 | Richardson et al. |
| 4,339,868 A | 7/1982 | Mazzer |
| 4,482,016 A | 11/1984 | Richardson |
| 4,680,127 A | 7/1987 | Edmondson |
| 4,903,772 A | 2/1990 | Johnson |
| 5,566,760 A | 10/1996 | Harris |
| 5,779,938 A | 7/1998 | Naraghi et al. |
| 8,387,697 B2 | 3/2013 | Alexandrov et al. |
| 2003/0037692 A1 | 2/2003 | Liu |
| 2005/0269100 A1 | 12/2005 | Farabee et al. |
| 2007/0056462 A1 | 3/2007 | Bates et al. |
| 2008/0289828 A1 | 11/2008 | Hutchins et al. |
| 2011/0203797 A1 * | 8/2011 | Alexandrov .......... E21B 36/008 166/300 |
| 2012/0012308 A1 | 1/2012 | Ziauddin et al. |
| 2012/0305255 A1 | 12/2012 | Zavolzhskiy et al. |
| 2013/0126169 A1 * | 5/2013 | Al-Nakhli ............... E21B 43/26 166/300 |
| 2013/0206400 A1 | 8/2013 | Alexandrov et al. |
| 2014/0144639 A1 * | 5/2014 | Nguyen ................... C09K 8/57 166/300 |
| 2015/0000912 A1 * | 1/2015 | Choudhary ........... E21B 36/008 166/300 |
| 2015/0337638 A1 | 11/2015 | Lawrence et al. |
| 2016/0244659 A1 | 8/2016 | Shahin et al. |

FOREIGN PATENT DOCUMENTS

| | | |
|---|---|---|
| EP | 0014267 A1 | 6/1983 |
| EP | 2436872 A2 | 4/2012 |
| RU | 2064576 C1 | 7/1996 |
| RU | 2100583 C1 | 12/1997 |
| RU | 2126084 C1 | 2/1999 |
| RU | 2154733 C1 | 8/2000 |
| RU | 2009115499 A | 10/2010 |
| SU | 640023 A1 | 12/1978 |
| WO | 199961395 A1 | 12/1999 |
| WO | 2008032067 A1 | 3/2008 |
| WO | 2010043239 A1 | 4/2010 |
| WO | 2012025150 A1 | 3/2012 |
| WO | 2013078306 A1 | 5/2013 |

* cited by examiner

*Primary Examiner* — Jeffrey D Washville
(74) *Attorney, Agent, or Firm* — Suiter Swantz pc llo

(57) ABSTRACT

A stimulation fluid including (i) an aqueous solution of an ammonium salt capable of being exothermally oxidized to produce heat and gas, (ii) an aqueous solution of an oxidizing agent capable of oxidizing the ammonium salt; (iii) a water-soluble inorganic acid salt and/or an organic carboxylic acid salt of a tertiary amine; (iv) a low molecular weight carboxylic acid; and (v) a high salinity brine containing divalent metal ions; and (vi) optionally, a surfactant.

19 Claims, No Drawings

RESERVOIR STIMULATION BY ENERGETIC CHEMISTRY

CROSS REFERENCE TO RELATED APPLICATIONS

This application claims the priority benefit of U.S. Provisional Application No. 62/211,479 filed on Aug. 28, 2015, the entire contents of which is incorporated herein by reference for all purposes.

FIELD OF THE INVENTION

The present invention relates to compositions and methods for stimulating oil or gas production from hydrocarbon-bearing reservoirs in conventional or unconventional formations.

BACKGROUND

Unconventional heavy oil deposits are enormous energy resources that have the capacity to cover the global energy needs for decades. The exploitation of such unconventional hydrocarbon resources may be economically attractive owing to rising demand for energy and higher oil prices. The recovery of these resources from subterranean formations, however, requires the use of different stimulation techniques that can be costly and technically challenging. In this regard, the selection of a suitable stimulation technique typically depends on the type of reservoir formation.

Subterranean formations can be distinguished by their major components such as carbonate and sandstone formations. The major constituent of sandstone formations is siliceous materials (e.g. quartz), and such formations may contain various amounts of clays, aluminosilicates such as kaolinite and illite, alkaline aluminosilicates such as feldspars and zeolites, carbonates such as calcite, dolomite and ankerite, and iron-based minerals such as hematite and pyrite.

Initially, in subterranean formations from which oil and/or gas can be recovered, a thermodynamic equilibrium established between the rock, formation water, and oil over millions of years. The injection of fluids of specific chemical compositions is able to alter the thermodynamic equilibrium between the different phases in a favorable way during the oil production period. The change in the equilibrium is mostly attributed to the change in the interaction between the injected fluids and rock surface, which usually results in altering the wettability of the formation rocks or creating new fluid flow paths.

By using stimulation techniques, the chemical and/or physical characteristics of the formation and hydrocarbon materials are altered to allow hydrocarbon materials to flow easily, facilitating removal from subterranean formations. Such stimulation techniques may include but are not limited to the following four types: (1) injection of reactive chemicals into the formation to generate in-situ gas and heat in order to reduce the heavy oil viscosity and enhance its mobility; (2) injection of a foaming agent to enhance the transportation of hydrocarbons in the subterranean formation; (3) pumping of acid solution into the formation at high temperature to react with the formation minerals to create new flow paths for the recoverable hydrocarbons; and (4) injection of fluids of different compositions to alter the wettability of the reservoir formation at different reservoir temperatures.

In terms of wettability, the activation energy for the wettability modification is related to how strongly the polar oil components are bonded to the rock surface, the solvency of the polar components in the actual phase and the reactivity of the ions in the injected fluids. It has been verified that high salinity water (seawater) is able to improve the water-wetness of carbonates leading to increased oil recovery by spontaneous imbibition and forced displacement at high temperature (Strand, S.; Puntervold, T.; Austad, T. Energy Fuels 2008, 22, 3222-3225). Similarly, Yields and Morrow observed that the ionic composition of the injected brine influences oil recovery in a forced displacement process in sandstones. (yildiz, H. O.; Morrow, N. R. J. Pet. Sci. Eng. 1996, 14, 159-168). However, Webb documented that increased oil recovery from sandstones by water flooding occurs by injecting low saline brine at low temperatures. (Webb, K. J.; Black, C. J. J.; Edmonds, I. J. Low salinity oil recovery—the role of reservoir condition coreflood. 13th European Symposium on Improved Oil Recovery, Budapest, Hungary, Apr. 25-27, 2005).

Consequently, the bonding energy between polar components in the oil and carbonates is higher than bonding energy between the same polar components and clay minerals and silica in sandstones. In fact, the combination of certain minerals, high temperature, salinity, surfactants, and the composition of formation water could all have a negative impact on possible wettability alteration-based EOR potential.

In the acidizing process, an acid solution in pumped into the formation to: (1) open "break down" perforation; (2) remove acid-soluble scales; and (3) increase permeability in the near-wellbore area, such as removing formation damage resulting from previous treatments. However, high temperature sandstone acidizing is challenging due to the complex side reactions that occur between the treatment fluids and sandstone minerals which could result in potentially damaging precipitation reactions.

Consequently, there is still a need to find a process and a stimulation fluid that further improve the permeability and water wettability of reservoir formations at the low or elevated temperatures that characterize a large number of reservoirs. In addition, a process and stimulation fluid that ensures the better removal of the near-wellbore damage without depositing precipitates in the formation is necessary, while generating in-situ gas and heat to thin the heavy oil and enhance its flowability is another issue.

SUMMARY OF THE INVENTION

The present invention comprises compositions and methods for stimulating oil or gas production from conventional and unconventional formations comprising hydrocarbon-bearing reservoirs of varying permeability, wherein a self-initiating, self-reactive treatment fluid capable of generating heat and nitrogen gas within the formation is injected into the reservoir.

In one aspect, the invention may comprise a self-initiating aqueous liquid solution comprises (i) an aqueous liquid solution of an ammonium salt capable of being exothermally oxidized to produce heat and gas, (ii) an aqueous solution of an oxidizing agent capable of oxidizing the ammonium salt; and (iii) a water-soluble corrosion inhibitor yielding compound that comprises a water-soluble inorganic acid salt and/or an organic carboxylic acid salt of a tertiary amine; (iv) a low molecular weight carboxylic acid; and (v) a high salinity brine containing divalent ions comprising $Ca^{2+}$ and/or $Mg^{2+}$; and (vi) optionally, a surfactant.

In another aspect, the invention comprises a method of stimulating a reservoir using the treatment fluids described herein. In one embodiment, the fluid is used in a method which comprises a pre-flush stage, a main treatment stage, and a post-flush stage. In the pre- and post-flush stages, a fluid is injected into the formation before or after the main treatment. The purposes of the pre- and post-flush stages include but are not limited to altering the wettability of the formation, displacing formation brine, displacing main treatment fluid, adjusting the salinity of the formation, dissolving calcareous minerals and/or dissolving iron scales.

DETAILED DESCRIPTION

The present invention relates to methods and compositions for the stimulation of hydrocarbon-bearing formations, including conventional and unconventional formations. It is often desirable to treat a portion of a reservoir with a treatment fluid in the effort to restore or enhance the productivity of a well. The methods and compositions may be suitable for hydrocarbon-bearing subterranean formations of varying mineral compositions, porosity and permeability. In embodiments of this invention, an aqueous fluid capable for generating gas and heat within the formation is injected into the reservoir, thereby altering the wettability of the formation minerals as well as removing small particles and dissolving acid-soluble minerals. This treatment makes the hydrocarbon-bearing formations more permeable to oil and enables increased oil and/or gas recovery from the formations. Additionally, it may clean the wellbore and descale the oil/gas production well and production equipment in order to enhance well performance.

This application is related to co-pending U.S. patent application Ser. No. 15/013,645, filed on Feb. 2, 2016, the entire contents of which are incorporated herein by reference, for all purposes.

As used herein, a "formation" is an underground formation which includes a hydrocarbon bearing reservoir, including oil and gas deposits in porous or fractured rock formations or oil deposits in unconsolidated sandstones of high porosity sands or carbonate, such as heavy oil deposits.

The self-initiating aqueous liquid solution comprises (i) an aqueous liquid solution of an ammonium salt capable of being exothermally oxidized to produce heat and gas, (ii) an aqueous solution of an oxidizing agent capable of oxidizing the ammonium salt; and (iii) a water-soluble corrosion inhibitor yielding compound that comprises a water-soluble inorganic acid salt and/or an organic carboxylic acid salt of a tertiary amine; (iv) a low molecular weight carboxylic acid; and (v) a high salinity brine containing divalent ions comprising Ca2+ and/or Mg2+; and (vi) optionally, a surfactant.

Any ammonium salt capable of being exothermally oxidized to generate nitrogen gas can be used to manufacture the self-reactive aqueous liquid solution. The ammonium salt used in the present invention may include but is not limited to ammonium hydroxide, ammonium chloride, ammonium bromide, ammonium nitrite, ammonium nitrate, ammonium sulfate, ammonium carbonate, ammonium iodide, diammonium phosphate, an ammonium salt of organic acids such as ammonium acetate, ammonium formate and/or combinations thereof. However, ammonium sulfate [(NH4)2 SO$_4$)] is preferred.

The oxidizing agent may comprise any suitable oxidizing agent that exothermally reacts with the ammonium ions to produce nitrogen gas and heat. The oxidizing agent may include but is not limited to alkali metal salts of nitrous acid (e.g. sodium nitrite), ammonium salts of nitrous acid (eg. ammonium nitrite), alkali metal salts of hypochlorite (e.g. sodium hypochlorite), hydrogen peroxides, and combinations thereof.

The tertiary amine salt is capable of dissociating in an aqueous solution at a relatively slow rate to produce an alkaline moiety, which increases the pH of the overall solution, and an acid moiety, which is capable of initiating the reaction between the said ammonium salt and oxidizing agent. The tertiary amine salt may include but is not limited to inorganic acid salts and organic carboxylic acid salts of a tertiary amine.

In one embodiment, the tertiary amine utilized in the present invention is of the formula:

(I)

where R1, R2, and R3 are alkyl or aryl. Examples of the said tertiary amine used in the present invention include those where the R1, R2, and R3 groups are the same or different, and may include benzyl, tolyl, cycloalkyl, alkanol, and alkyl of 1-30 carbons. In this general formula, R1, R2, and R3 can all be the same substituent or different substituents. Examples of noncyclic tertiary amines include but are not limited to trimethylamine, triethylamine, tri-n-propylamine, tri-n-butylamine, dimethyldodecylamine, and dimethyltetradodecylamine.

Inorganic acid salts may comprise the mineral acids of the formula HX, such as HCl, H$_2$SO$_4$, and H$_3$PO$_4$. Organic carboxylic acids generally have the formula RCOOH, where R is alkyl or aryl. In a preferred embodiment, the organic carboxylic acid may comprise dicarboxylic acids such as tartaric acid (dihydroxybutanedioic acid) (II), oxalic acid (III), succinic acid (butanedioic acid) (IV), maleic or fumaric acid (butenedioic acid) (V), or tricarboxylic acids such as citric acid (VI).

(II)

(III)

(IV)

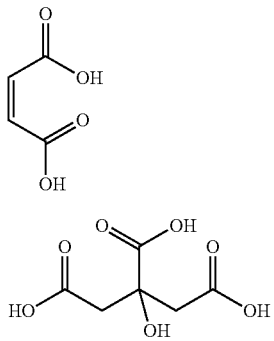

In one embodiment, the preferred reaction for the in-situ heat generation in the present invention is that between ammonium sulfate and sodium nitrite in the presence of an inorganic salt of a tertiary amine as shown in the following reaction:

$$(NH_4)_2SO_4 + 2NaNO_2 \rightarrow 2N_2 + Na_2SO_4 + 4H_2O$$

$$\Delta H(298K) = -627.6 \text{ kJ/mol} \qquad (1)$$

The high salinity brine used here contains a considerable number of cations such as $Na^{2+}$, $Ca^{2+}$, and/or $Mg^{2+}$. As used herein, "high salinity brine" means an aqueous solution having greater than about 2% of salt by weight, preferably greater than about 4%, and more preferably about 6% or greater. In one embodiment, the high salinity brine may comprise about 8% of a dissolved salt.

It has been found that in carbonate formations, $Ca^{2+}$, $Mg^{2+}$, and $SO_4^{2-}$ are the active ions in the wettability alteration process (Zhang, P.; Austad, T. Colloids Surf. A 2006, 279, 179-187). Initially, the $SO_4^{2-}$ component adsorbs onto the positively charged carbonate surface, decreasing the positive charge density of the carbonate surface. As a result, more $Ca^{2+}$ ions can be attached to the carbonate surface. Subsequently, $Ca^{2+}$ ions react with the adsorbed polar components in the oil and displace it from the carbonate surface according to the following equation:

$$RCOO\text{---}Ca\text{---}CaCO3(S) + Ca2+ + SO42\text{-} \rightleftharpoons RCOO\text{-}Ca++Ca\text{-}CaCO3(S) + SO42\text{-} \qquad (2)$$

Therefore, $SO_4^{2-}$ functions as a catalyst promoting the increase in the $Ca^{2+}$ concentration close to the carbonate surface. Increasing the $Ca^{2+}$ concentration on the carbonate surface alters its wettability toward more water-wet conditions in carbonate formation and improves the spontaneous imbibition of the brine. Consequently, the $SO_4^{2-}/Ca2+$ system changes the surface reactivity of the carbonate formation and enhances oil recovery.

In another aspect, the $SO_4^{2-}$ ions are strongly solvated in water via hydrogen bonds and as a result, high temperature is required to break the hydrogen bonds in order to increase the reactivity of the $SO_4^{2-}$ ions toward the carbonate surface. It has been reported that $SO_4^{2-}$ ions are unable to alter the wettability of the chalk surface or improve the spontaneous imbibition of the brine in the presence of high NaCl concentrations. In fact, no significant increase in oil production has been observed at 100° C. in the presence of a high concentration of NaCl. Nevertheless, at 130° C., the spontaneous imbibition of seawater increases the water-wet surface fraction of a chalk plug from 0.6 to 1.0.

Consequently, in addition to being able to provide the energy required to thin heavy oil, the in-situ heat generation reaction used in the present invention has the advantage of providing not only the $SO_4^{2-}$ ions required to promote the $Ca^{2+}$ ion concentration close the carbonate surface, but also the required energy to enhance its reactivity toward the carbonate surface, even at a high NaCl concentration.

In another embodiment, the initial adsorption of the non-dissociated acid and protonated basic components in the oil on the negatively charged clay surface dictates the initial wettability of the sandstone rocks and depends upon the pH at the local water-rock interface as well as on the temperature and salinity of the formation water. The sandstone rocks thus become less water-wet at pH vales below 6 and at high salinity.

The stimulation fluid in the present invention contains inorganic acid and/or an organic carboxylic acid salt of a tertiary amine and low molecular weight carboxylic acid, such as acetic acid. The tertiary amine salt dissociates slowly in water to produce an alkaline moiety, which increases the pH at the water-clay interface. The local pH increase at the clay surface promotes the desorption of the non-dissociated acid and protonated basic compounds in the oil from the clay surface and enhances the microscopic sweep efficiency. In addition, the $Ca^{2+}$ ion on the clay surface can function as a bridging ion between the negatively charged clay surface and polar components in the oil. Therefore, exchanging the $Ca^{2+}$ with $H^+$ from the low molecular carboxylic acid present in the fluid can also promote the microscopic sweep efficiency, even in the presence of highly saline water and at a high temperature.

The low molecular weight carboxylic acid may comprise formic acid, acetic acid, propionic acid, butyric acid or valeric acid.

In a preferred embodiment, surfactants are usually added to the main treatment fluids or in a separate fluid during the treatment of the subterranean formation to make the formation water wet. The addition of the surfactants enhances the sweeping effect of the treatment fluids which are commonly aqueous solutions. The fluids herein preferably contain a nonionic or anionic surfactant. The nonionic surfactants in the fluid are preferably selected from a group consisting of alkanolamides, alkoxylated alcohols, alkoxylated amines, amine oxides, alkoxylated amides, alkoxylated fatty acids, alkoxylated fatty amines, alkoxylated alkyl amines, alkyl phenyl polyethoxylates lecithin, hydroxylated lecithin, fatty acid esters, glycerol esters, and their ethoxylates. The anionic surfactant is preferably selected from the group of sulfonates, hydrolyzed keratin, sulfosuccinates taurates, betaines, modified betaines, and alkyamidobetaines.

Finally, the invention process can be performed at any temperature encountered when treating a subterranean formation preferably 25° C. and 200° C. In addition, it can be carried out at any pressure higher than atmospheric pressure.

DEFINITIONS AND INTERPRETATION

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

The term "and/or" means any one of the items, any combination of the items, or all of the items with which this term is associated. The phrase "one or more" is readily understood by one of skill in the art, particularly when read in context of its usage.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

The invention claimed is:

1. A self-initiating, self-reactive treatment fluid for treating a hydrocarbon-bearing reservoir in a formation, comprising an aqueous solution comprising: (a) an ammonium salt capable of being exothermally oxidized to produce heat and nitrogen gas; (b) an oxidizing agent capable of oxidizing the ammonium salt; and (c) a free tertiary amine salt or a compound which reacts to form a free tertiary amine salt in situ; (d) a low molecular weight carboxylic acid; and (e) a high salinity brine containing divalent ions comprising $Ca^{2+}$ and/or $Mg^{2+}$; and (f) optionally, a surfactant.

2. The treatment fluid of claim 1 wherein the ammonium salt comprises ammonium hydroxide, ammonium chloride, ammonium bromide, ammonium nitrite, ammonium nitrate, ammonium sulfate, ammonium carbonate, or an ammonium salt of an organic acid.

3. The treatment fluid of claim 2 wherein the ammonium salt comprises ammonium acetate or ammonium formate.

4. The treatment fluid of claim 1 wherein the oxidizing agent comprises an alkali metal salt of nitrous acid, an ammonium salt of nitrous acid, alkali metal salts of hypochlorite, or hydrogen peroxide.

5. The treatment fluid of claim 2 wherein the oxidizing agent comprises an alkali metal salt of nitrous acid, an ammonium salt of nitrous acid, alkali metal salts of hypochlorite, or hydrogen peroxide.

6. The treatment fluid of claim 4 wherein the oxidizing agent comprises sodium nitrite and the ammonium salt comprises ammonium sulphate.

7. The treatment fluid of claim 1 wherein the tertiary amine salt comprises an inorganic acid salt or organic carboxylic acid salt of a tertiary amine of the formula I:

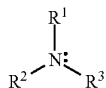

wherein $R^1$, $R^2$ and $R^3$ are the same or different, and each is an alkyl or aryl group having between 1 and 30 carbon atoms.

8. The treatment fluid of claim 4 wherein the tertiary amine salt comprises an inorganic acid salt or organic carboxylic acid salt of a tertiary amine of the formula I:

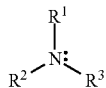

wherein $R^1$, $R^2$ and $R^3$ are the same or different, and each is an alkyl or aryl group having between 1 and 30 carbon atoms.

9. The treatment fluid of claim 7 wherein one or more of $R^1$, $R^2$ and $R^3$ groups is benzyl, tolyl, cycloalkyl, alkanol and alkyl.

10. The treatment fluid of claim 7 wherein the tertiary amine comprises trimethylamine, triethylamine, tri-n-propylamine, tri-n-butylamine, dimethyldodecylamine, or dimethyltetradodecylamine.

11. The treatment fluid of claim 1 wherein the compound which reacts to form a free tertiary amine salt is a polyoxymethylene.

12. The treatment fluid of claim 6 wherein the tertiary amine is a corrosion inhibitor.

13. The treatment fluid of claim 10 wherein the tertiary amine comprises trimethylamine.

14. The treatment fluid of claim 1 wherein the low molecular weight carboxylic acid comprises formic acid, acetic acid, propionic acid, butyric acid or valeric acid.

15. The treatment fluid of claim 11 wherein an acid-generating compound is capable of reacting with a portion of the ammonium salt to produce an acid or tertiary amine salt.

16. The treatment fluid of claim 12 wherein an acid-generating compound comprises an aldehyde, a di-aldehyde or a polyoxymethylene.

17. The treatment fluid of claim 13 wherein an acid-generating compound comprises methanal, acetal, propanal, glyoxal, malondialdehyde, succinic dialdehyde, paraformaldehyde or trioxane.

18. A method of stimulating a subterranean hydrocarbon-bearing reservoir penetrated by a wellbore, comprising the step of placing into the reservoir a self-initiating self-reactive treatment fluid comprising (a) an ammonium salt capable of being exothermally oxidized to produce heat and nitrogen gas; (b) an oxidizing agent capable of oxidizing the ammonium salt; and (c) a free tertiary amine salt or a compound which reacts to form a free tertiary amine salt; (d) a low molecular weight carboxylic acid; and (e) a high salinity brine containing divalent ions comprising Ca2+ and/or Mg2+; and (f) optionally, a surfactant.

19. The method of claim 18 wherein the treatment fluid further comprises an acid-generating compound.

* * * * *